Patented June 24, 1947

2,422,926

UNITED STATES PATENT OFFICE 2,422,926

ALKYL-SUBSTITUTED AROMATIC SULFONATES

Howard F. Reeves, Jr., Wyandotte, Mich., assignor to Wyandotte Chemicals Corporation, Wyandotte, Mich., a corporation of Michigan No Drawing. Application April 1, 1944, Serial No. 529,135

5 Claims. (Cl. 260—505)

This invention relates to new chemical compounds and mixtures, many of which are useful as washing, scouring, wetting, detergent, penetrating and emulsifying agents.

Broadly this invention relates to the preparation of sulfonated alkylated aromatic compounds and their metallic or basic nitrogen salts, wherein said aliphatic group is secured from halogenated wax type hydrocarbons. An object of the present invention, therefore, is to prepare sulfonated alkylated aromatic compounds wherein the alkyl group or groups designate one or more mineral hydrocarbon waxes; and the aromatic nucleus or nuclei designate preferably single ring aromatic hydrocarbons with or without hydrocarbon or non-hydrocarbon substituents, as for example, benzene, toluene, xylene and chlorobenzene. But multiple ring aromatic hydrocarbon compounds or hydrocarbon substituted or non-hydrocarbon substituted multiple ring hydrocarbons such as naphthalene, diphenyl or chlorodiphenyl may be used.

It is an additional object to provide improved methods of producing said sulfonates of the types referred to supra by condensation with the aid of a condensation catalyst such as AlCl₃, followed by sulfonation, whereby sulfonated products are obtained which are sufficiently free from colored by-products as to be commercially acceptacle.

It is also an object of my invention to prepare alkylated aromatic condensation products.

It has been discovered in accordance with the present invention that by halogenating a mineral hydrocarbon wax so as to form halogen compounds, condensing the resultant mixed halogen derivatives with a mono- or polynuclear aromatic compound, preferably in the presence of a condensation catalyst of the Friedel-Crafts type, and then sulfonating the mixed alkyl-aryl compounds, valuable compositions are obtained which are aromatic sulfonated compounds containing as nuclear substituents hydrocarbons present in mineral wax. While no effort has been made to determine the nature of the sulfonated compounds, based upon analogous products, they are believed to be true sulfonic acids. It is preferred to use a chlorine type of halogenated wax as the intermediate and the preferred aromatic compound which is condensed therewith is the mono ring type such as benzene or a phenol.

By the term "wax" or "mineral wax" as employed herein, it will be understood that what is meant is a hydrocarbon mixture which is solid or semi-plastic at a temperature of 30° C. or below. According to page 323 of "Chem. Refinery of Petroleum" by Kalichevsky and Stagner (1942 ed.) there are two types: (1) crystalline, such as paraffin and (2) petrolatums or microcrystalline type. Illustrative of mineral waxes are: paraffin wax, slop wax, cerasin, ozokerite, rod wax, slack wax, crude scale wax and petrolatum. There are several commercial grades of paraffin wax differing in source, chemical composition, physical properties and degree of refinement. Table in the Bucher and Graves article in the J. Ind. and Eng. Chem. 19, 718 (1927) gives the M. P. and formula of various petroleum waxes. The mineral waxes are predominantly saturated hydrocarbons and are considered to consist mostly of the hydrocarbons of at least 18 carbon atoms. They include both straight and branch-chain compounds and possible alicyclic hydrocarbons.

By the term "waxyl-aryl" herein is denoted the chemical condensation product of an aforesaid wax with an aromatic compound. The term "waxyl" is the descriptive term applicable to the wax radical as herein defined.

The mineral wax or mixtures of several different kinds can be chlorinated to various degrees of chlorination between 20 and 500 molar per cent. The optimum degree of chlorination for the paraffin wax melting in the range 48–52° C. was found to be between 262 and 320 molar per cent for the subsequent condensation and sulfonation.

The degree of chlorination of the wax has a significant bearing on the several properties of the final product. The paraffin wax was assumed to have an average molecular weight of 338 and to have an average composition corresponding to the empirical formula $C_{24}H_{50}$ according to this article by Bucher and Graves. The degree of chlorination is expressed as mol per cent chlorinated, as well as weight per cent chlorine. The mol per cent chlorination is obtained from the following equation:

$$\frac{WI}{34.5} \times \frac{M}{R} \times 100 = \text{mol per cent chlorination}$$

where WI represents the actual gain in weight of the wax chlorinated; M represents the average molecular weight of the wax and R represents the weight of the wax prior to chlorination. A high degree of chlorination results in practically complete utilization of the wax thereby making recovery of the unreacted wax unnecessary.

The wax can be chlorinated at various temperatures, as for example, 0 to 150° C. and at various speeds. It is preferred to chlorinate in the melted condition and in the neighborhood of 60–80° C. Chlorination may be carried out with the aid of chlorine catalysts, as for example, PCl₃, I, sunlight, etc. There is usually formed in addition to monochlorides, a proportion of higher chlorides.

The physical appearance of the chlorinated waxes is dependent upon the degree of chlorination. In the case of chlorinated paraffin wax of a lower degree of chlorination, as containing 200 molar per cent chlorine, the material is of a thick semi-solid consistency at room temperature and has a slightly yellow color. This wax chlorinated to a higher degree, as about 300 molar per cent chlorine, is a semi-fluid oil at room temperature and has a light yellow color.

In the condensation of the halogenated wax hydrocarbon with the aromatic hydrocarbon, AlCl₃ is the preferred reagent, although other Friedel-Crafts catalysts such as FeCl₃, ZnCl₂ and Al-Hg amalgam can be used, the last producing the metallic halides in situ. Moreover anhydrous gaseous HF can be used. The amounts employed can be varied. Applicant has found that while amounts between 5–20% of AlCl₃ based upon the weight of chlorinated wax are satisfactory, the amount used depends upon the degree of chlorination of the wax, a highly chlorinated wax such as 400% requires more catalyst than one chlorinated 100%. Lesser amounts such as 4% up to 5% can be employed, particularly if some of the features disclosed as to subsequent steps are followed. If any of the other catalysts are employed in combination, the amount of AlCl₃ can be reduced; but more per mol of the supplementary catalyst with the exception of amalgam will have to be used than the AlCl₃ replaced. Granular AlCl₃ has been found to give a lighter colored waxyl-aryl condensation product than the powdered form.

It is preferred to use benzene in excess to carry the reaction toward completion, an expedient recognized in texts as to all Friedel-Crafts reactions. It is better to keep the temperature at 30° C. or below until the chlorinated wax addition has been completed. When the evolution of HCl gas has slowed off, the temperature of the reaction mixture should be increased, such as to 50–60° C. However, these temperatures can be varied.

In accordance with this preferred method the reaction mixture is permitted to stand whereby it stratifies into two layers. The upper layer, which is quite fluid, is composed predominantly of waxyl substituted aryl compounds, unreacted aromatic compound and a small amount of unreacted wax. The lower layer is chiefly the aromatic compound such as benzene and the tarry catalyst complex. While the lower layer can be recovered according to established methods then sulfonated, this will not be discussed herein. The upper layer is separated from the lower as by decantation and recovered. It is preferred to first wash the separated upper layer one or more times as with dilute hydrochloric acid, followed by one or more water washes. This serves to remove a small amount of dissolved catalyst. The condensation product may be treated with clays or other adsorbents instead of employing the hydrochloric acid wash. This upper layer is then treated to remove unreacted aromatic hydrocarbon as by distillation; this is collected for reuse in the process. It is preferred to remove the last residual parts of the aromatic compound, employing reduced pressure, avoiding however, any decomposition.

The physical appearance of the condensation product varies with the degree of chlorination of the waxes. Waxyl-benzenes prepared from the chlorinated waxes of low degree chlorination were light yellow semi-solid materials at room temperature, while the products from the higher degree chlorinated waxes were viscous oils.

The waxyl-aryl condensation products may be further purified, if considered desirable, by using H₂SO₄, AlCl₃, adsorbent clays or it may be distilled at low pressure; or a combination of these may be used.

The distilland, freed from unreacted aromatic compounds, is then sulfonated. Suitable sulfonating agents are sulfuric acid of various strengths; as for example, 66° Bé. sulfuric acid, sulfuric acid monohydrate, oleum (26 per cent or 65 per cent) or chlorsulfonic acid. The temperatures at which the sulfonation is carried out may vary within wide limits. For example, temperatures as low as 0° and as high as about 140° C. may be employed. In general, the more vigorous the sulfonation agent the lower is the preferred temperature. Preferred sulfonation temperatures lie between about 5° C. and about 90° C. The amount of chlorsulfonic acid may be so determined that there is no excess sulfonating agent. Or with any sulfonating agent only relatively small excess thereof need be left in the final sulfonated mixture.

The ratio of sulfonating agent to the mixture of waxyl-aryl compounds may also vary. Thus, for complete sulfonation the sulfonating agent in terms of 100 per cent sulfuric acid may range from 0.25 to 10 times or more the weight of the waxyl-aryl compound to be treated. The extent of sulfonation may vary with the individual material being reacted, the duration of time of sulfonation, and the use to be made of the sulfonated product.

After the completion of the sulfonation, the spent acid is generally removed. A convenient way to do this is to permit stratification. The separation is much faster if the sulfonation mass is held at 50–60° C. to prevent partial solidification of the upper layer containing the waxyl-benzene sulfonic acids.

While the sulfonated waxyl-aryl compound may be employed for some purposes as such, it is usually converted to the alkali-, alkaline earth- or other metallic salts, particularly the alkali salts or basic nitrogen salts. An expedient way to form the salts is by reacting an aqueous dispersion of the waxyl-aryl compounds with a metal oxide, or hydroxide, ammonia or an organic base or a suitable salt of one of these, in an amount adapted to form a neutral product. Among the bases, oxides and salts which may be combined with the sulfonated products to secure salts are, for example, sodium-, potassium- and ammonium hydroxide, sodium-, potassium- and ammonium carbonate and bicarbonate, ammonia, magnesium oxide; ethylamine; pyridine; alkylolamines; such as, triethanol-amine; diaminopropanol ethylene diamine; triethylene tetramine; aniline; toluidine, etc.

The reaction mixture from the sulfonation may be directly employed for the formation of salts of the waxyl-aryl sulfonic acids and other acids present in the reaction mixture such as sodium waxyl-aryl sulfonates admixed with sodium sulfates. Or the inorganic salts may be removed from the organic sulfonates, by such expedients as taking advantage of the greater solubility of the latter in organic solvents; or the alkaline metal salt solution, or colloidal solution, may be treated with sodium chloride whereby the alkali metal salt is salted out. This product is freed from sodium sulfate and it may be dried.

After the neutralization of the sulfonated waxyl-aryl compounds, it is usually desirable to dry the product. This can conveniently be done on a double drum drier. After the material has been dried, it may be washed with an organic solvent, such as petroleum ether or ethylene dichloride, or otherwise physically or chemically treated to remove any unreacted wax-, or non-sulfonated condensation product.

The waxyl-aromatic compound liberated from the alkylation catalyst complex, previously referred to may likewise be sulfonated and converted into an alkali metal salt or other salts or left non-neutralized.

These dry alkali sulfonate compositions cannot only be employed as previously indicated, but can be added to volatile hydrocarbon and other dry cleaning solvents for detergent purposes.

In order that the invention may be understood more fully, reference should be had to the following examples which are illustrative of this invention.

EXAMPLE 1

200 parts of paraffin wax possessing a melting range of 48–52° C. were placed in a 3 neck flask equipped with an agitator and a gas dispenser. The wax was melted and heated to a temperature of 70–75° C. Chlorine gas was admitted through the gas disperser while the molten wax was agitated; after a short induction period a vigorous reaction started. The wax was illuminated with a tungsten filament electric light bulb during the chlorination period; cooling was necessary to dissipate the heat evolved. The temperature was maintained at 65° C. because at a lower temperature and at the rate of chlorine feed employed, the liquid turned yellow indicating that the chlorine was building up and not reacting promptly. The rate of chlorine addition under the operation conditions indicated was approximately 15 g. of chlorine per hour for each 100 g. of wax. The rate is dependent upon the cooling ability of the apparatus as well as intensity of illumination and the temperature at which the chlorination is carried out. The amount of chlorine added was determined by the weight increase of the wax. The chlorination was stopped when the weight per cent chlorine of the chlorinated wax was 16.3. This represents 190 mol per cent chlorination. The material had a strong odor of hydrogen chloride, due to a small amount of HCl in solution, a by-product of the reaction.

The chlorinated wax was added to 262 g. of benzene containing 16.8 g. of granular anhydrous $AlCl_3$ accompanied by agitation. The reaction commenced promptly, accompanied by the evolution of HCl. The temperature of the reaction mass was not permitted to exceed 30° C. After addition of the chlorinated wax was completed and evolution of HCl (gas) had slowed off, the reaction mixture was heated to 50–60° C. for 1 hour or until HCl was no longer evolved.

In the above, the amount of $AlCl_3$ is based upon the ratio of 15 g. of $AlCl_3$: each gram atom of combined chlorine in the chlorinated wax, i. e. weight increase attributable to chlorine. Benzene was used in excess, 3 mols of benzene being used on the same basis.

The reaction mixture separated into two layers on standing. The upper layer was quite fluid and of a light red color, composed predominantly of benzene and waxyl-benzene. The upper layer was decanted from the lower one and given two washes with 15% aqueous hydrochloric acid, followed by three washes with water.

This moist oily liquid was placed in a distilling flask and the major portion of the benzene was removed by distillation at atmospheric pressure. It was found necessary to heat the material to 150° C. at a pressure of 80–100 mm. to remove the last residual benzene. The distilland was a light yellow semi-solid material at room temperature.

The waxyl-benzene was sulfonated with oleum containing 3% free $SO_3$. The reaction was carried out by gradually adding the oleum to the waxyl-benzene and agitating the mixture at 55–60° C. for 1½ hours. About 1.33 parts of oleum were used per part of waxyl-benzene. After completion of the sulfonation step, the material was poured into a separatory funnel and allowed to stand while maintained at 50–60° C. to prevent solidification of the upper layer. The lower layer composed of spent acid was discarded.

The waxyl-benzene sulfonic acids still retaining some sulfuric acid were then dispersed in 4–6 volumes of water and thereupon neutralized by the addition of 50% strength sodium hydroxide solution. The neutral material (pH 7) was dried on a double drum drier. The product was a cream colored powder that contained 48% $Na_2SO_4$. Treatment with petroleum ether removed any non-sulfonated products such as wax.

EXAMPLE 2

200 g. of same melting range paraffin wax were treated by the same procedure as set out in Example 1, except that the chlorination was carried on until the weight per cent chlorine was 25.8; which corresponds to 334 mol per cent chlorinated. The rest of the procedure including proportions was carried out as indicated in the previous example.

EXAMPLE 3

200 g. of the same melting range paraffin wax were treated by the same procedure as set out in Example 1, except that the chlorination was carried out until the weight per cent chlorine was 29.4; which corresponds to 404 mol per cent chlorinated.

EXAMPLE 4

200 g. of paraffin wax, melting at 71–74° C. was placed in a reaction flask and melted. Chlorine gas was added while the molten wax was exposed to light at 90° C. until the wax showed a weight gain of 43.5 g. which corresponds to 300 mol per cent chlorinated and weight per cent chlorine of 17.9.

The chlorinated wax was dissolved in 200 cc. of a petroleum ether boiling at 70–100° C. and added to a mixture of naphthalene, petroleum ether of the same boiling range and $AlCl_3$. The mixture contained 320 g. naphthalene and 20 g. of anhydrous $AlCl_3$. The mixture was agitated for 2 hours at 40° C. and then warmed to and held at 70° C. for 2 hours. The lower layer was separated in the same manner as in the previous examples. The upper layer was washed with 15 per cent HCl and then with water, the petroleum ether distilled off and the unreacted naphthalene separated from the wax substituted naphthalene by vacuum distillation. 100 g. of the resulting wax substituted naphthalene was sulfonated by heating to 80° C. with 175 g. of 100 per cent $H_2SO_4$ for 1 hour. The mixture was agitated vigorously during the sulfonation. The entire sulfonation mass was then dispersed in 1000 cc. of water and neutralized with 50 per cent NaOH to give an aqueous slurry of waxyl naphthalene sodium sulfonates and sodium sulfate. The slurry was dried on a drum drier to give a cream colored powder composed of Na₂SO₄ and sodium waxyl naphthalene sulfonates.

EXAMPLE 5

800 g. of petrolatum was placed in a 2 liter flask and slowly melted in an oven. The temperature was brought to 70° C. and chlorine gas was admitted through a gas dispenser while the molten mass was illuminated with an ordinary electric light during agitation thereof. After a short induction period of about 15 minutes, reaction started with the evolution of HCl; increase of temperature made cooling necessary. Addition of chlorine was continued until the petrolatum had gained 255 g. in weight, representing 320 mol per cent chlorination. The reaction temperature was 68–75° C. and the chlorination rate was approximately 100 g. of chlorine added to this wax per hour.

1055 g. of the chlorinated petrolatum contained 7.4 g. atoms of combined chlorine. Based upon 3 mols of benzene per atom of combined chlorine, 22.2 mols or 1730 g. of benzene were used for the condensation reaction. The amount of dry granular AlCl₃ employed was 111 g., which is equivalent to 15 g. AlCl₃ per gram atom of chlorine.

The chlorinated wax was thereupon added to the benzene and AlCl₃, while it is being agitated, and over a period of 1½ hours. There was a vigorous evolution of HCl; by control of the rate of addition the temperature was held around 30° C. The reaction mixture was then warmed to 50–60° C. for 1½ hours and permitted to stand overnight. The upper layer was separated from the lower layer containing the AlCl₃ complex, then washed twice with HCl of 15 per cent strength and three times with water. The unreacted benzene was removed by distillation giving 1000 g. of a light yellow waxyl-benzene.

This was sulfonated with 1.3 times its weight of oleum containing 3 per cent SO₃. The oleum was added to the waxyl-benzene condensation product over a period of ½ hour and the mixture was agitated at 55–60° C. for 1½ hours. The sulfonation mass was placed in an oven held at 50° C. for 3 hours to aid separation into two layers. The lower layer was composed primarily of spent acid was drained off and discarded. The upper layer, a thick red mass of pasty consistency at room temperature consisted of the waxyl-benzene sulfonic acid.

The upper layer was thereupon dispersed in about 5 times its weight of water and neutralized by the addition of 50 per cent strength NaOH to a pH of 7. The dispersion of neutralized material was heated to 70° C. and dried on a double drum drier. The dried product contained sodium sulfate in addition to the petrolatum-benzene sodium sulfonate as the major constituent, and a small amount of free wax.

It is desirable from a manufacturing standpoint to chlorinate the various mineral waxes to such a degree that they are completely converted into waxyl-aryl compounds, thereby avoiding the step of separation of unreacted wax from the waxyl-aryl condensation products or their sulfonate salts. The objectionable feature of unreacted wax in waxyl-benzene sodium sulfonates or other like salts in the slight turbidity of their aqueous solutions.

The following table gives the effect of degree chlorination on conversion of paraffin wax of M. P. 48–52° C. to waxyl-benzene and waxyl-benzene sodium sulfonate:

Table

| Grams Wax | Grams Added to Wax-Cl | Mol Percent Chlorinated | Grams of Waxyl-Benzene | Grams of Sodium Waxyl-Benzene Sulfonate |
|---|---|---|---|---|
| 100 | 19.4 | 190 | 67.0 | 91 |
| 100 | 24.2 | 237 | 78.5 | 103 |
| 100 | 27.8 | 272 | 98.0 | 122 |
| 100 | 34.8 | 341 | 93.0 | 124 |
| 100 | 39.7 | 390 | 88.0 | 111 |

In the above the unreacted wax was removed by extracting the waxyl-benzene sodium sulfonate with low boiling petroleum ether in the ratio of 30 g.:100 cc., filtering and washing with about 50 cc. of petroleum ether and drying.

The above examples are simply illustrative and not exhaustive and accordingly, applicant does not intend to be limited in any way except as restricted by the terms of the claims. In the claims the term "sulfonates" is tended to cover the free acids and their salts.

I claim:

1. The process of making higher alkyl aromatic hydrocarbon substituted products which comprises chlorinating a mineral hydrocarbon wax having a melting point of not less than 30° C. to a degree of chlorination corresponding to 190 to 390 mol per cent chlorination, condensing the resultant chlorinated wax with an aromatic hydrocarbon, and then sulfonating the resultant condensation product.

2. The process of making higher alkyl-benzene sulfonated products which comprises chlorinating a mineral hydrocarbon wax having a melting point of not less than 30° C., to a degree of chlorination corresponding to 190 to 390 mol per cent chlorination, condensing the resultant chlorinated wax with benzene in an amount corresponding to approximately 3 mols of benzene to each mol of chlorine in said chlorinated wax, and then sulfonating the resultant condensation product.

3. The process of making higher alkyl-benzene sulfonated products which comprises chlorinating a mineral hydrocarbon wax having a melting point of 48–52° C. to a degree of chlorination corresponding to 190 to 390 mol per cent chlorination, condensing the resultant chlorinating wax with benzene, the latter being present in a proportion of approximately 3 mols of benzene to each mol of chlorine in said chlorinated wax, and then sulfonating the resultant condensation product.

4. A sulfonated higher alkyl-substituted aromatic hydrocarbon compound which is substantially free from unreacted wax after sulfonation treatment and in which the higher alkyl group is derived from a hydrocarbon mineral wax having a melting point of 48–52° C. and chlorinated to 262–320 mol per cent chlorination, and in which the aromatic hydrocarbon compound is benzene.

5. The process of making higher alkyl-benzene sulfonated products which comprises chlorinating a mineral hydrocarbon wax having a melting point of 48–52° C. to a degree of chlorination corresponding to 262–320 mol per cent chlorination, condensing the resultant chlorinated wax with benzene in an amount of approximately 3 mols of benzene to each mol of chlorine in said chlorinated wax, and then sulfonating the resultant condensation product.

HOWARD F. REEVES, Jr.

REFERENCES CITED

The following references are of record in the file of this patent:

UNITED STATES PATENTS

| Number | Name | Date |
|---|---|---|
| 2,158,680 | Retailliau | May 16, 1939 |
| 1,197,019 | Essex | Sept. 5, 1916 |
| 2,032,097 | Piggott | Feb. 25, 1936 |
| 2,049,058 | Gleason | July 28, 1936 |
| 2,340,838 | Otto | Feb. 1, 1944 |
| 2,180,314 | Thomas | Nov. 14, 1939 |
| 2,247,365 | Flett | July 1, 1941 |
| 2,267,725 | Flett | Dec. 30, 1941 |
| 2,317,987 | Flett | May 4, 1943 |

FOREIGN PATENTS

| Number | Country | Date |
|---|---|---|
| 416,379 | Great Britain | Sept. 6, 1934 |